United States Patent [19]

Shimizu

[11] Patent Number: 4,815,071
[45] Date of Patent: Mar. 21, 1989

[54] PACKET-SWITCHED COMMUNICATIONS NETWORK FOR EFFICIENTLY SWITCHING NON-BURST SIGNALS

[75] Inventor: Hiroshi Shimizu, Tokyo, Japan

[73] Assignee: NEC Corporation, Tokyo, Japan

[21] Appl. No.: 85,574

[22] Filed: Aug. 14, 1987

[30] Foreign Application Priority Data

Aug. 14, 1986 [JP] Japan ................................ 61-189528

[51] Int. Cl.⁴ ............................................ H04Q 11/04
[52] U.S. Cl. ......................................... 370/60; 370/94
[58] Field of Search ....................... 370/85, 86, 89, 60, 370/94; 340/825.05, 825.5

[56] References Cited

U.S. PATENT DOCUMENTS 4,553,234 11/1985 Brandsma et al. .................... 370/89

Primary Examiner—Robert L. Griffin
Assistant Examiner—Frank M. Scutch, III
Attorney, Agent, or Firm—Sughrue, Mion, Zinn, Macpeak, and Seas

[57] ABSTRACT

In a packet-switched communications network, each of a plurality of node stations is responsive to a request for a circuit-switched call from a source user terminal and transmits a control packet and a message packet in succession to the other node stations. The control packet contains a source address, a destination address, a unique address and a time slot number identifying the time slot in which the circuit-switched call is to be carried. The message packet contains the same unique address as that sent with the preceding control packet and a plurality of time slots identified by the time slot numbers containing in various control packets. On receiving a message packet having the same unique address as that sent with a previous control packet, a destination station extracts an information signal from the message packet using the time slot number contained in the previous control packet and supplies the extracted signal to a user terminal identified by the destination address.

10 Claims, 6 Drawing Sheets

PACKET-SWITCHED COMMUNICATIONS NETWORK FOR EFFICIENTLY SWITCHING NON-BURST SIGNALS

BACKGROUND OF THE INVENTION

The present invention relates to packet-switched communications networks having a plurality of interconnected node stations each serving a plurality of user terminals, and more specifically to such a packet-switched communications network in which each of the node stations is capable of switching circuit-switched signals (non-burst signals).

In packet switching, the transmission medium of the network are occupied for as long as a packet propagates through it. For this reason packet-switched network is best suited for switching burst signals. By packetizing non-burst signals and incorporating a priority control scheme it is possible to integrate circuit-switched signals with packet-switched signals (burst signals) in a single network. However, the necessity to append addresses to each packet represents a substantial amount of overhead and significantly reduces the transmission efficiency.

U.S. Pat. No. 4,569,041 discloses an integrated circuit/packet switching system including a plurality of interconnected node stations each serving a plurality of user terminals. In this system, non-burst signals are sampled at 125 microseconds intervals and a plurality of such samples are stored in memory for a predetermined time interval to form a circuit-switched signal. A plurality of circuit-switched signals are carried on respective time slots of a fixed-length packet which is destined to the same node station. The overhead of the packet includes time slot numbers in addition to source and destination addresses. Although high efficiency switching can be achieved when connections are established from a given source node to the same destination node, multiple connections from a given source node to multiple destination nodes requires packets to be directed to respective destination nodes with a resultant decrease in the network switching efficiency. Furthermore, each node station must be provided with as many transmit buffers as there are destination nodes at a given instant of time.

SUMMARY OF THE INVENTION

Therefore, an object of the present invention is to provide a packet-switched communications network which is capable of efficiently switching non-burst signals between multiple node stations through a common transmission medium.

This object is obtained by identifying a circuit-switched call by a particular combination of a unique address and a time slot number and by communicating the combination to a receiving station. A plurality of circuit-switched signals are multiplexed into different time slots of a single message packet appended with the same unique address as that previously sent. The receiving station is allowed to extract a circuit-switched signal from the time slot identified by the communicated time slot number when the unique address contained in the message packet coincides with the previously communicated unique address.

Specifically, a source station communicates a unique address and first and second time slot numbers to one or more destination stations. The combination of the unique address and the first time slot number identifies a first circuit-switched call from a first source terminal of the source station to a first destination terminal and the combination of the unique address and the second time slot number identifies a second circuit-switched call from a second source terminal of the source station to a second destination terminal. The first and second destination terminals are serviced by said one or more destination stations. The source station then transmits first and second circuit-switched signals from the first and second source user terminals respectively on first and second time slots of a single packet along with the unique address to a common transmission medium to allow said one or more destination stations to extract the first and second circuit-switched signals from the first and second time slots in accordance with the first and second time slot numbers, respectively, and apply the extracted signals to the first and second destination terminals when the unique address contained in the packet coincides with the previously communicated unique address.

According to a modified embodiment of the invention, a designated station has a plurality of unique addresses as a common network resource, the number of such unique addresses being smaller in number than the total number of stations in the network. The designated station selects a unique address from the resource of the unique addresses and communicates the selected unique address to the source station when a circuit-switched call is originated. The source station utilizes the communicated unique address to establish circuit-switched communication.

More specifically, the packet-switched communications network has a plurality of node stations and a transmission medium interconnecting the node stations. Each node station services one or more user terminals and is responsive to a request for a circuit-switched call from a source user terminal of the own station to transmit to the transmission medium a control packet containing a source address identifying the source user terminal, a destination address identifying a destination user terminal of another node station, a unique address and a time slot number identifying the position of a time slot in which a circuit-switched signal from the source user terminal is to be contained. The control packet is followed by a message packet which contains the same unique address as that sent with the control packet and a plurality of time slots one of which is identified by the time slot number and contains the circuit-switched signal from the source user terminal The node station designated by the destination address receives the control packet, receives the message packet having the same unique address as that contained in the received control packet and extracts the circuit-switched signal from the time slot of the received message packet in accordance with the time slot number contained in the received control packet and applies the extracted signal to the user terminal identified by the destination address.

According to the modified embodiment, a packet-switched communications network has a first, control station and a plurality of second, controlled stations and a transmission medium interconnecting the first station and the second stations, each of the second stations serving one or more user terminals and including means for transmitting a request for a circuit-switched call to the transmission medium. The first station selects a unique address from among a plurality of unique addresses smaller in number than the number of the second stations, transmits the selected unique address to the transmission medium in response to a request for a circuit-switched call. The second (source) station which has requested the circuit-switched call receives the assigned unique address through the transmission medium and transmits to the transmission medium a control packet containing a source address identifying a source user terminal of the own station, a destination address identifying a destination user terminal of another station, the received unique address and a time slot number which identifies the position of a time slot in which a circuit-switched signal from the source user terminal is to be contained. The source station then transmits to the transmission medium a message packet containing the unique address and a plurality of time slots which are identified respectively by the time slot numbers contained in a plurality of the control packets. Each control packet is received through the transmission medium by a destination station when the destination address contained therein coincides with the address of a user terminal serviced by the destination station. The message packet is then received by the same destination station when the unique address contained therein coincides with the unique address contained in the received control packet. The circuit-switched signal is extracted from the received message packet in accordance with the time slot number contained in the received control packet and applied to the user terminal identified by the destination address.

BRIEF DESCRIPTION OF THE DRAWINGS

The present invention will be described in further detail with reference to the accompanying drawings, in FIG. 1 is a schematic block diagram of a token ring packet-switched communications network.

DETAILED DESCRIPTION OF FIRST PREFERRED EMBODIMENT STRUCTURES AND FUNCTIONS

Figure 1:
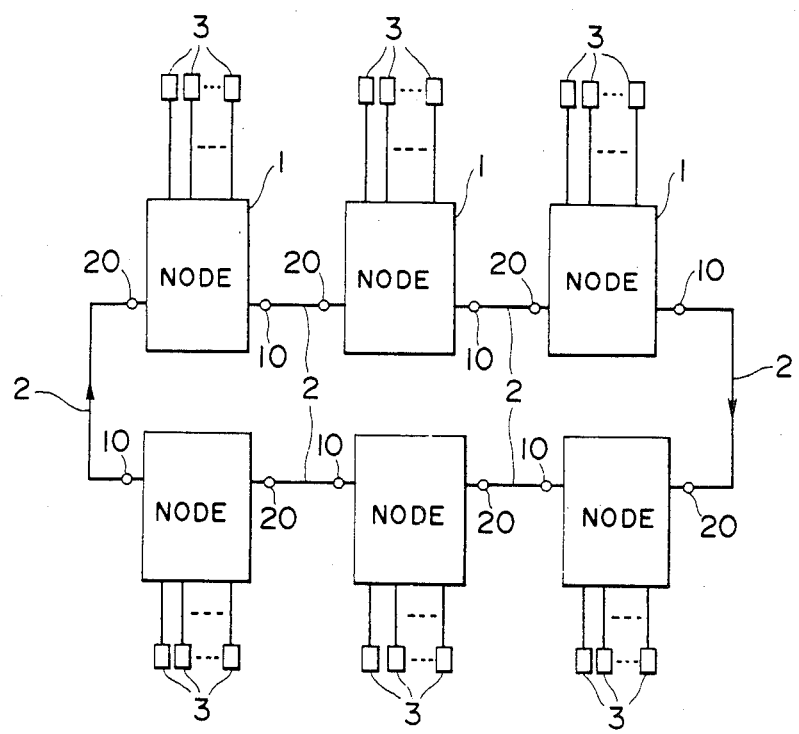

The present invention is implemented in a packet switched local-area network as shown in FIG. 1. The network handles circuit-switched calls (continuous type signals). However, the packet switched network of the present invention can be made to handle both circuit-switched calls and packet-switched calls (burst type signals) by modifying it in a manner as will be described later. For purposes of illustration, the network is shown as comprising a token ring 2 in which a plurality of node stations 1 are interposed and each node station services a plurality of user terminals 3. It is to noted that other network topology such as a token bus system or a point-to-point system could equally be as well be employed. When the system is initialized, a designated station generates a token which travels through an output port 10 of each station to an input port 20 of the next station until it is seized by a station ready to transmit. The sending station is responsible for removing its own packet from the ring. When establishing an internode connection in response to the origination of a circuit-switched call, the serving station generates a call setup control packet to allow a series of variable-length message packets to propagate through the established connection to a destination user terminal. When clearing the connection, the sending station transmits a call-clearing control packet to the network. Each message packet has header and trailer information and a plurality of time slots for carrying circuit-switched signals such as voice, facsimile and the like from a plurality of user terminals serviced by the same node station. The number of time slots contained in a message packet is variable according to the number of circuit-switched calls from a given source node station.

Figure 2:
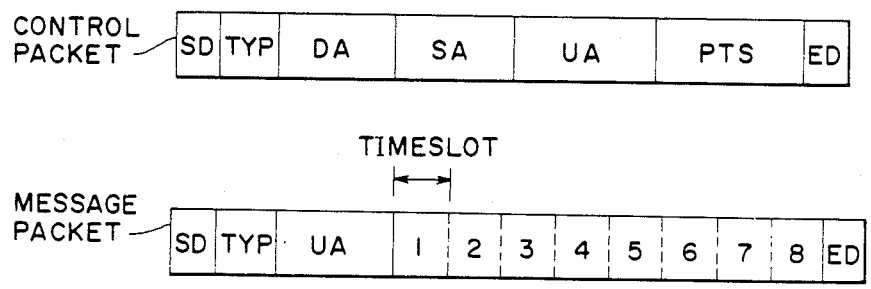
FIG. 2 is an illustration of the data formats of a control packet and a message packet.

As shown in FIG. 2, the control packet includes a starting delimiter (SD), a type field (TYP) that represents a circuit-switched call, a destination address field (DA) identifying the destination user terminal, a source address field (SA) for identifying the source user terminal, and a control field which includes a unique address (UA) and a packet time-slot number (PTS). Each node station is uniquely assigned a node address. The unique address (UA) comprises the node address of each station plus a packet identifier. Assume that a given node station serves a maximum of 64 user terminals, the message packet will have to carry a maximum of 8 circuit-switched calls on its time slots and a maximum of 8 such message packets is identified by the unique address. In this case, the packet identifier can be represented by a 3-bit code. The packet time slot number (PTS) identifies the position of the time slot in which the circuit-switched signal of a particular source user terminal is carried. The control packet ends with an ending delimiter (ED).

The header information of the message packet includes a starting delimiter (SD), a type field (TYP) representing circuit-switched call and a unique address (UA) field containing the same information as that contained in the unique address field of the control packet. Following the unique address field is a series of time slots each of which is identified by a sequential time slot number. The message packet terminates with an ending delimiter (ED).

Figure 3:
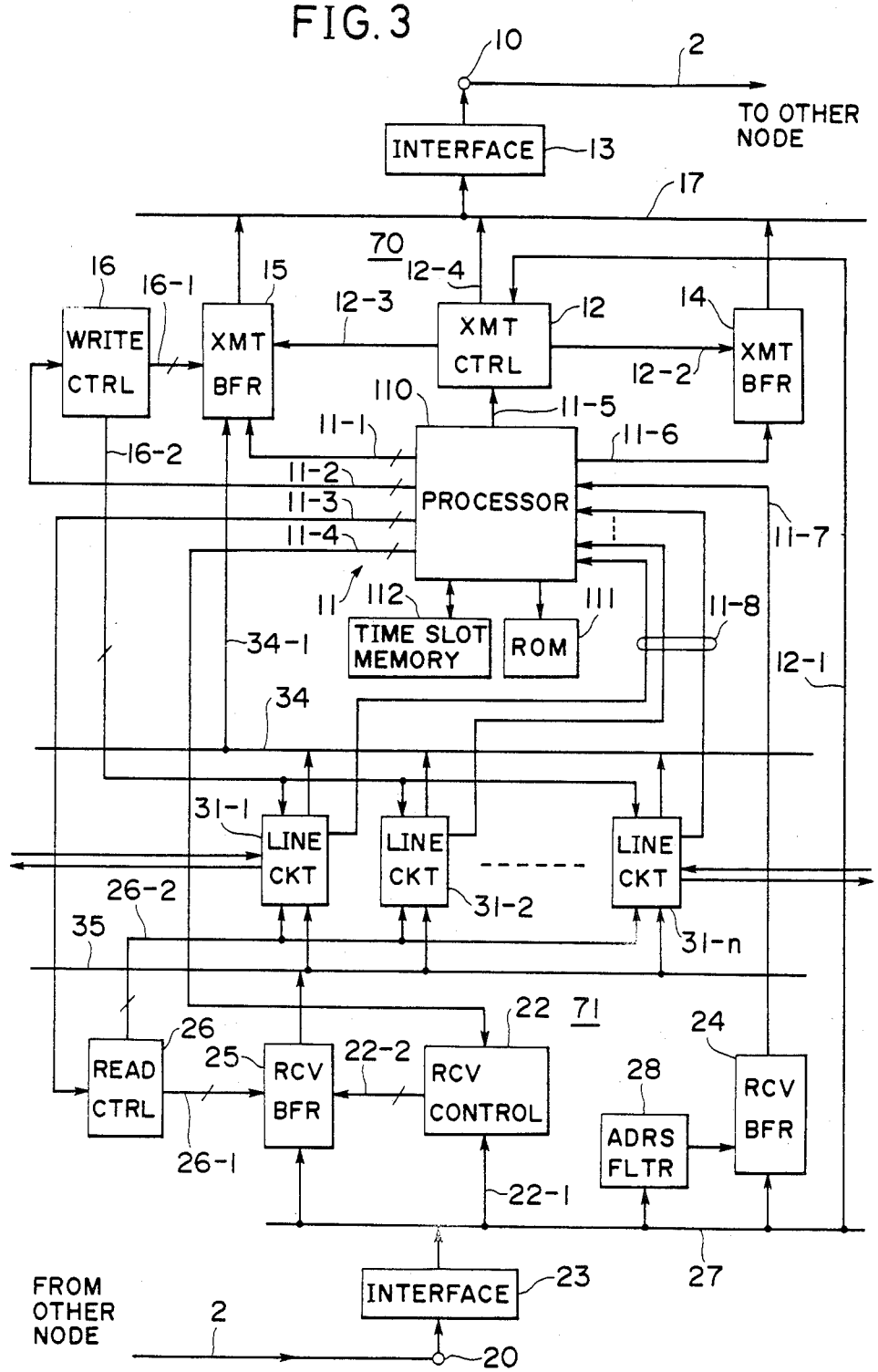
FIG. 3 is a block diagram of each node station according to a first embodiment of the present invention.

As shown in detail in FIG. 3, each of the node stations 1 generally comprises a transmit unit 70, a receive unit 71, a plurality of line circuits 31-1 through 31-n associated respectively to user terminals 3-1 through 3-n, and a node controller 11. Transmit unit 70 is connected to the output port 10 through an internode transmit bus 17 and an interface 13, and comprises a transmit controller 12, a control-packet transmit buffer 14, a message-packet transmit buffer 15 and a write controller 16 associated with the message-packet transmit buffer 15. Receive unit 71 is connected to the input port 20 through an internode receive bus 27 and an interface 23, and includes a receive controller 22, control-packet receive buffer 24, message-packet receive buffer 25, read controller 26 and an address filter 28.

Transmit controller 12 is connected through an input line 12-1 to the internode receive line 27 to seize a token when it is notified by the node controller 11 that transmit buffers 14 and 15 ar ready to transmit and enables them through lines 12-2 and 12-3 to transmit packages.

If there is no packet to transmit, transmit controller 12 passes all incoming signals through an output line 12-4 to the ring 2.

Node controller 11 comprises a processor 110, a read-only memory 111 and a time slot memory 112. Processor 110 determines the unique address of a destination node and the bandwidth, or data transmission speed on the token ring 2 and the time slot number of an empty time slot on an intranode transmit bus 34 on receiving a call origination signal from any one of the line circuits. Processor 110 also determines the time slot number of an empty time slot on an intranode receive bus 35 on receiving an incoming call. Read-only memory 111 stores the control program for the processor 110 and time slot memory 112 stores the busy/idle status of time slots on the intranode transmit and receive buses 34 and 35.

On requesting a call, each line circuit communicates a call request signal and a packet-type identifier through lines 11-8 to processor 110. When handling an internode circuit-switched call, the processor 110 secures the required transmission speed on ring 2, typically 64 kbps and organizes a circuit-switched control (call setup) packet in a manner as mentioned above and supplies it through line 11-6 to the control-packet transmit buffer 14. In response to a transmit enable pulse on line 12-2, the control packet is forwarded onto the ring 2.

Message-packet transmit buffer 15 is connected through a bus 11-1 to processor 110 to receive from it header information (starting delimiter, type and unique address data), trailer information (ending delimiter) and their memory addresses and further connected by line 34-1 to intranode transmit bus 34 to receive circuit-switched signals from line circuits 31. Write controller 16 is associated with processor 110 through a bus 11-2 to receive from it a set of source line-circuit address (SLA) data and transmit-buffer memory address (MA) data to define a memory cell in the transmit buffer 15 in which the circuit-switched signal from a source line circuit is to be stored along with the transmit time slot number (TTS) of an empty time slot which is available for the source line circuit to access the transmit bus 34. For a particular circuit-switched call, processor 110 determines a relationship between the memory address (MA) on the one hand and the source line-circuit address (SLA), the destination address (DA) and the transmit time slot number (TTS) assigned to the source line circuit on the other. Write controller 16 maintains this relationship during the lifetime of a circuit-switched call to periodically supply the memory address (MA) to the buffer 15 as a write address pointer through bus 16-1 and supplies the source line-circuit address (SLA) through bus 16-2 to all the line circuits 31, so that the source line circuit sends a cicuit-switched signal to the buffer 15 through line 34-1 at the instant the buffer 15 is addressed by write controller 16. In this way, a circuit-switched signal from a source line circuit is periodically stored into the specified memory cell of the transmit buffer 15. A plurality of such circuit-switched signals are stored in successively specified memory cells of the transmit buffer 15 and a message packet is composed in this way with header and trailer information supplied from the processor 110 through bus 11-1. The message packet so composed is put onto the ring 2 through internode bus 17 and interface 13 in response to a transmit enable pulse supplied on line 12-3 from the transmit controller 12.

Address filter 28 is connected to the bus 27 to examine the unique address contained in each control packet and enables the control-packet receive buffer 24 to accept the control packet and pass it to the processor 110 through a line 11-7 when it detects the own station address in the destination address (DA) field of the control packet. Receive controller 22 is associated with the processor 110 through a bus 11-4 to receive from it the receive time slot number (RTS) of an empty time slot available on the intranode receive bus 35 for a destination line circuit to receive packets along with the unique address (UA) and time slot number (PTS) data contained in a control packet received from a source station and is connected to the internode receive bus 27 to receive message packets through an input line 22-1. The purpose of this receive controller 22 is to supply the receive time slot number RTS to the message-packet receive buffer 25 as a write address pointer through an output bus 22-2 in accordance with the unique address (UA) and packet time slot number (PTS) of the call setup packet if the unique address (UA) contained in each of the received message packets coincides with the unique address of the call setup packet. If coincidence occurs between the unique addresses, the circuit-switched signals contained in the successive time slots of each message packet are stored into specified memory cells of the receive buffer 25. Read controller 26 is associated with the processor 110 through a bus 11-3 to receive from it a destination line-circuit address (DLA) and a receive time slot number (RTS). The purpose of the read controller 26 is to periodically supply the destination line-circuit address (DLA) to the message-packet receive buffer 25 as a read address pointer through an address bus 26-1 for data retrieval and to all the line circuits 31 through a bus 26-2 to cause the destination line circuit to timely open its gate to receive the retrieved signal.

Figure 4:
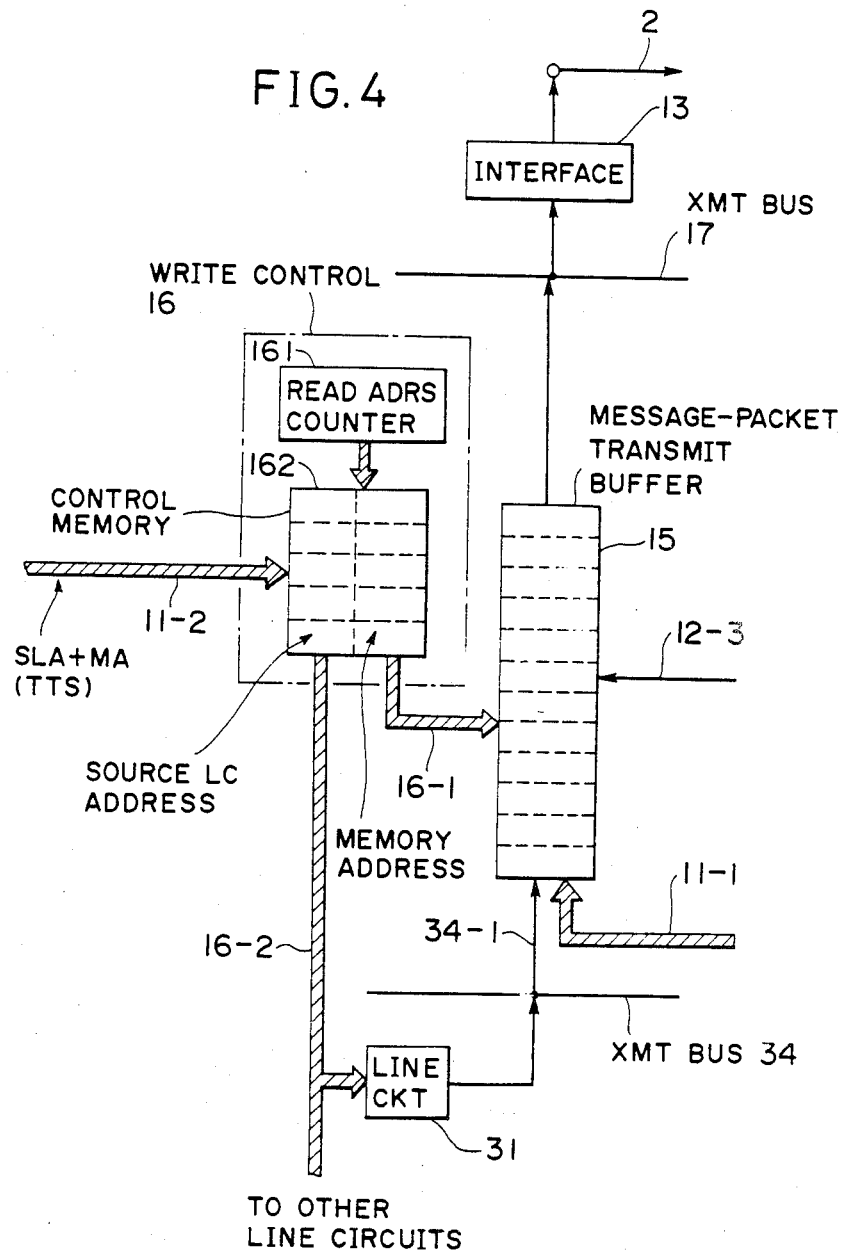
FIG. 4 is a block diagram illustrating the detail of the message-packet transmit buffer and the associated write controller.
Figure 5:
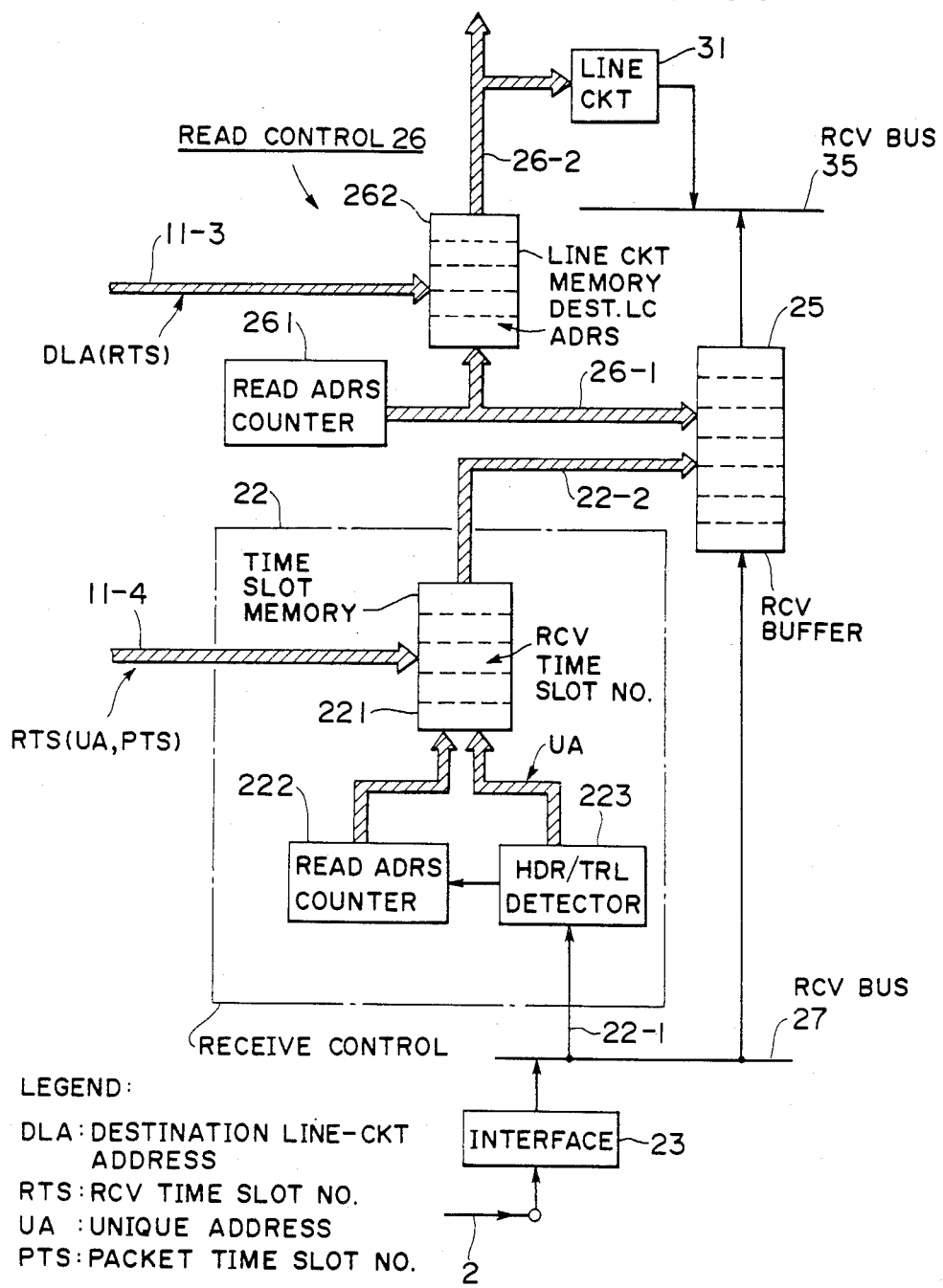
FIG. 5 is a block diagram illustrating the detail of the message-packet receive buffer and the associated receive control and read controller.

For a better understanding of the present invention, reference is now made to FIGS. 4 and 5 in which details of the message-packet transmit and receive buffers 15 and 25 and their associated circuits are respectively shown. In FIG. 4, write controller 16 comprises a read address counter 161 and a control memory 162. Read address counter 161 is periodically driven at all times by clock pulses which are synchronized with the time slots of the intranode transmit bus 34 to supply a sequentially incremental read address to the control memory 162. Control memory 162 is a matrix cell having two columns and a plurality of rows and operates in a write mode during the call-setup phase to receive source line-circuit address (SLA) and memory address (MA) as storage data and transmit time slot number (TTS) as an address pointer from the processor 110. The source line-circuit address (SLA) and memory address (MA) are respectively stored into the left and right columns of a row which is addressable as a function of the transmit time slot number (TTS). The output of the left-column cells of control memory 162 is connected through bus 16-2 to all the line circuits 31 and the output of the right-column cells is connected through bus 16-1 to the write address input of message-packet transmit buffer 15. To the transmit buffer 15 are supplied the header and trailer information on bus 11-1 from processor 110 and circuit-switched signals from the line circuits 31 on line 34-1.

During a data transfer phase, control memory 162 is switched to a read mode and is sequentially accessed by the read address counter 161, so that memory address data is periodically supplied to the write address input of transmit buffer 15 and source line-circuit address is supplied at the same time to all the line circuits. The call-requesting line circuit is enabled by the source line-circuit address and a circuit-switched signal is communicated from it to the data input of transmit buffer 15. Since the read address counter 161 is synchronized with the time slots of the transmit bus 34, each circuit-switched signal is stored into a specified memory area of the buffer 15. If there is a multiple access circuit-switched call, a plurality of such memory areas are specified in the transmit buffer 15 to carry multiple circuit-switched signals on successive time slots of the same message packet. Alternatively, the multiple access circuit-switched call may be combined with other circuit-switched calls in a message packet, or carried on separate message packets if the number of destination terminals exceed the maximum number of time slots in the message packet.

In FIG. 5, receive controller 22 comprises a time slot memory 221, a read address counter 222 and a header/trailer detector 223. Time slot memory 221 is in a write mode during call setup phase to receive from the processor 110 a receive time slot number (RTS) as storage data and a unique address (UA) plus a packet time slot number (PTS) as write address data through bus 11-4 and stores the receive time slot (RTS) data into a cell location addressable as a function of the UA and PTS address data. Time slot memory 221 is in a read mode during data transfer phase to receive read address data from the header/trailer detector 223 and read address counter 222. Header/trailer detector 223 is connected through input line 22-1 to the internode receive bus 27 to examine the header and trailer information of each incoming internode message packet to detect a unique address to switch the time slot memory 221 to read mode and applies the detected unique address to the read address input of time slot memory 221 and enables the counter 222 to produce an incremental read address. This incremental read address is combined with the unique address at the read address input of the time slot memory 221 to read the stored receive time slot number (RTS) data out of the memory 221 to the write address input of the receive buffer 25 through output bus 22-2. Thus, for a particular circuit-switched call, time slot memory 221 establishes a relationship between destination address (DA), unique address (UA) and packet time slot number (PTS) contained in a control packet and the unique address (UA) contained in a subsequent message packet and the sequential time slot positions represented by the incremental read address from counter 222. As a result, if the unique address detected in a message packet is identical to that sent with a previous control packet, receive controller 22 supplies a signal to the buffer 25 indicating when to write the circuit-switched signal of a source terminal into the cell position which is to be accessed by the destination user terminal. Subsequently, header/trailer detector 223 examines the trailer information of the received message packet to detect its ending delimiter (ED). On detecting it, the detector 223 disables the read address counter 222 to cease write operation of the buffer 25. In order to prevent the receive buffer 25 from being accessed by wrong message packets, invalid write address data (which do not specify any of the memory areas of buffer 25) are stored into such locations of time slot memory 221 which are not addressed by the processor 110 in response to the previous control packet destined to the own station during call setup phase.

Read controller 26 includes a read address counter 261 and a line circuit memory 262. Line circuit memory 262 is in a write mode during call setup phase to receive a destination line-circuit address (DLA) as storage data and the receive time slot number (RTS) as write address data from the processor 110 through bus 11-3, and is switched to a read mode following the detection of an ending delimiter by header/trailer detector 223 to receive read address data from the counter 261. Counter 222 stops count operation when the header/trailer detector 223 detects the ending delimiter. Counter 261 is constantly incrementing its count on a free-running basis in synchronism with the time slots of the intranode receive bus 35 to produce an incremental receive time slot number (RTS), whereby the destination line-circuit address (DLA) data is read out of the line circuit memory 262 in synchronism with a time slot of the receive bus 35 which is assigned to the destination line circuit. The output of read address counter 261 is also applied to the read address input of the receive buffer 25 through bus 26-1 to read circuit-switched signals therefrom onto the intranode receive bus 35. Since the time slot of receive bus 35 is associated with the destination line circuit, the latter is caused to timely open its gate to receive the circuit-switched signal read out of receive buffer 25.

For intranode circuit-switched calls, an intranode buffer and a read/write controller, not shown, are provided to exchange calls between line circuits over the intranode transmit and receive buses 34 and 35.

OPERATION

INTERNODE CALL SETUP PHASE

When a circuit-switched internode call is originated from line circuit 31-1, for example, processor 110 is notified of the address of line circuit 31-1, the type of call and the address of a destination user terminal serviced by another node station. Processor 110 accesses the time slot memory 112 to check the busy/idle status of the intranode transmit bus 34 for the presence of an empty time slot in it. If there is one, processor 110 assigns it to the line circuit 31-1 and organizes a call setup packet using the notified destination and source addresses, the unique address that identifies the message packet on which the circuit-switched signal of line circuit 31-1 is to be carried and a packet time slot number identifying the time slot position of the signal. With starting and ending delimiters being appended, the call setup packet is transferred from processor 110 through line 11-6 to the control-packet transmit buffer 14. The sending station is now ready to transmit a control packet. Processor 110 communicates this fact to the transmit controller 12 and directs it to seize the token travelling through the ring 2 to obtain the right to transmit. Upon seizure of the token, transmit controller 12 enables the transmit buffer 14 in accordance with the data supplied from the processor 110 to forward the stored call setup packet onto the ring. On the other hand, processor 110 of the source station determines the memory address (MA) of the message-packet transmit buffer 15 and supplies it through bus 11-2 to the data input of control memory 162 along with the source line-circuit address (SLA) and supplies the time slot number (TTS) of the transmit time slot assigned to the source line circuit 31-1 to the address input of control memory 162. In this way, the transmit buffer 15 is conditioned to generate a message packet to be transmitted to the destination station during a subsequent data transfer phase.

At one or more destination stations, the call setup packet from the source station is stored into the control-packet receive buffer 24 and detected by the address filter 28. Upon detection of coincidence between the destination address of a user terminal of the receiving station and the destination address (DA) contained in the call setup packet, address filter 28 directs the receive buffer 24 to forward the received call setup packet through line 11-7 to the processor 110. Processor 110 accesses the time slot memory 112 to check the busy/idle status of the intranode receive bus 35 for the presence of an empty time slot in it. If there is one, processor 110 assigns it to the destination line circuit 31-2 of the receiving station, for example, and proceeds to set the receive controller 22 and read controller 26 into condition for storing message packets into receive buffer 25. Specifically, processor 110 supplies the receive time slot number (RTS) of the time slot assigned to the destination line circuit 31-2 to the data input of time slot memory 221 through bus 11-4 and to the address input of line circuit memory 262 through bus 11-3. Processor 110 further determines the address (DLA) of the destination line circuit 31-2 using the destination address (DA) contained in the call setup packet and supplies it to the data input of line circuit memory 262, and applies the received unique address (UA) and packet time-slot number (PTS) to the address input of time slot memory 221. In this way, the receive buffer 25 of the receiving station is now ready to receive message packets from the sending station, and a circuit-switched connection is thereby established between the sending and receiving stations.

INTERNODE DATA TRANSFER PHASE

With a circuit-switched connection being established between the source station and one or more destination stations, processor 110 at the source station supplies the header and trailer information on bus 11-1 to message-packet transmit buffer 15. The source line circuit 31-1 is enabled in response to the source line-circuit address (SLA) data supplied on bus 16-2 from control memory 162 to cause a circuit-switched signal to be sent from the source line circuit to message-packet transmit buffer 15 and stored into a memory cell specified by the memory address supplied on bus 16-1 from control memory 161. A message packet is thereby organized in the transmit buffer 15. Recognizing that the node station is ready to transmit a message packet, processor 110 communicates the starting position of the control packet in the transmit buffer 15 and the length of the message packet to the transmit controller 12 and directs it to seize the token travelling through the ring 2 to obtain the right to transmit. Transmit buffer 15 is thus enabled to forward the message packet onto the ring.

The message packet travels through the ring and received by the header/trailer detector 223 of the destination station (FIG. 5). Upon detection of the unique address contained in the message packet, header/trailer detector 223 and read address counter 222 access the time slot memory 221 and read the receive time slot number (RTS) out of the memory 221 to the write address input of receive buffer 25 to write one or more circuit-switched signals contained in the packet time slots into memory cells of the buffer 25 specified by the receive time slot numbers (RTS) stored in memory 221. When detecting the ending delimiter of the message packet, header/trailer detector 223 directs the read address counter 261 to drive the line circuit memory 262 and receive buffer 25 with an incremental address, whereby the circuit-switched signals are read out of buffer 25 into one or more destination line circuits.

At the end of a circuit-switched call, the source station clears the contents of control memory 162 and sends a call clearing packet from the control-packet transmit buffer 14 to the control-packet receive buffer 24 of the destination station.

Since the combination of a unique address and a time slot number uniquely identifies a circuit-switched call from a given source user terminal to a given destination user terminal, multiple circuit-switched calls can be sent on the same message packet. Therefore, the present invention requires only one transmit buffer for message packets and eliminates the prior art requirement that as many transmit buffers be provided as there are destination stations.

If a new circuit-switched call occurs during the time the system is handling a given circuit-switched call which is directed to the same destination station as that of the new call and if this given call includes empty time slots, such time slots can be utilized to carry the new call. The utilization of such empty time slots eliminates the need for securing the bandwidth on the transmission ring for the new circuit-switched call.

The packet-switched network of the invention is modified to handle packet-switched calls in addition to circuit-switched calls. This can be accomplished by connecting the intranode transmit bus 34 to the control-packet transmit buffer 14 and connecting the intranode receive buffer 35 to the control-packet receive buffer 24 and providing a bus access controller which integrates circuit-switched calls with packet-switched calls. Such a bus access controller is described in co-pending U.S. patent application Ser. No. 871,037, filed June 5, 1986.

APPLICATION OF THE FIRST EMBODIMENT

Figure 6:
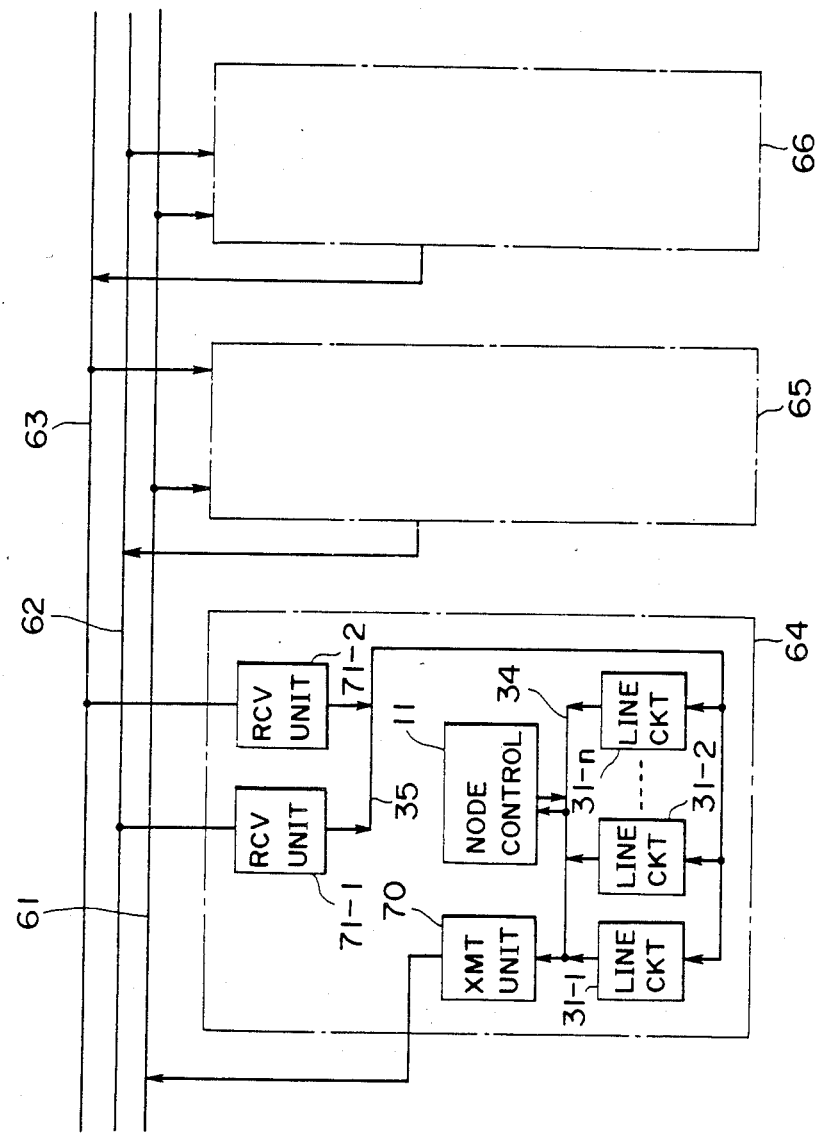
FIG. 6 is a block diagram of a packet-switched network having plurality of transmission lines.

The first embodiment of the present invention can be applied in a network architecture as shown in FIG. 6. In this network, the node stations are interconnected by transmission lines 61, 62 and 63 respectively provided for node stations 64, 65 and 66. Each node station comprises $(n-1)$ receive units 71, where n represents the number of node stations. Receive units of each node stations are respectively connected to the transmission lines of other node stations. Thus, receive units 71-1 and 71-2 of the node station 64 are connected to transmission lines 62 and 63. Transmit unit 70 of each node station is connected to the associated transmission line. Since this network eliminates the need for token passing, the transmit controller 12 of the previous embodiment can be dispensed with.

DESCRIPTION OF A SECOND EMBODIMENT

Figure 7:
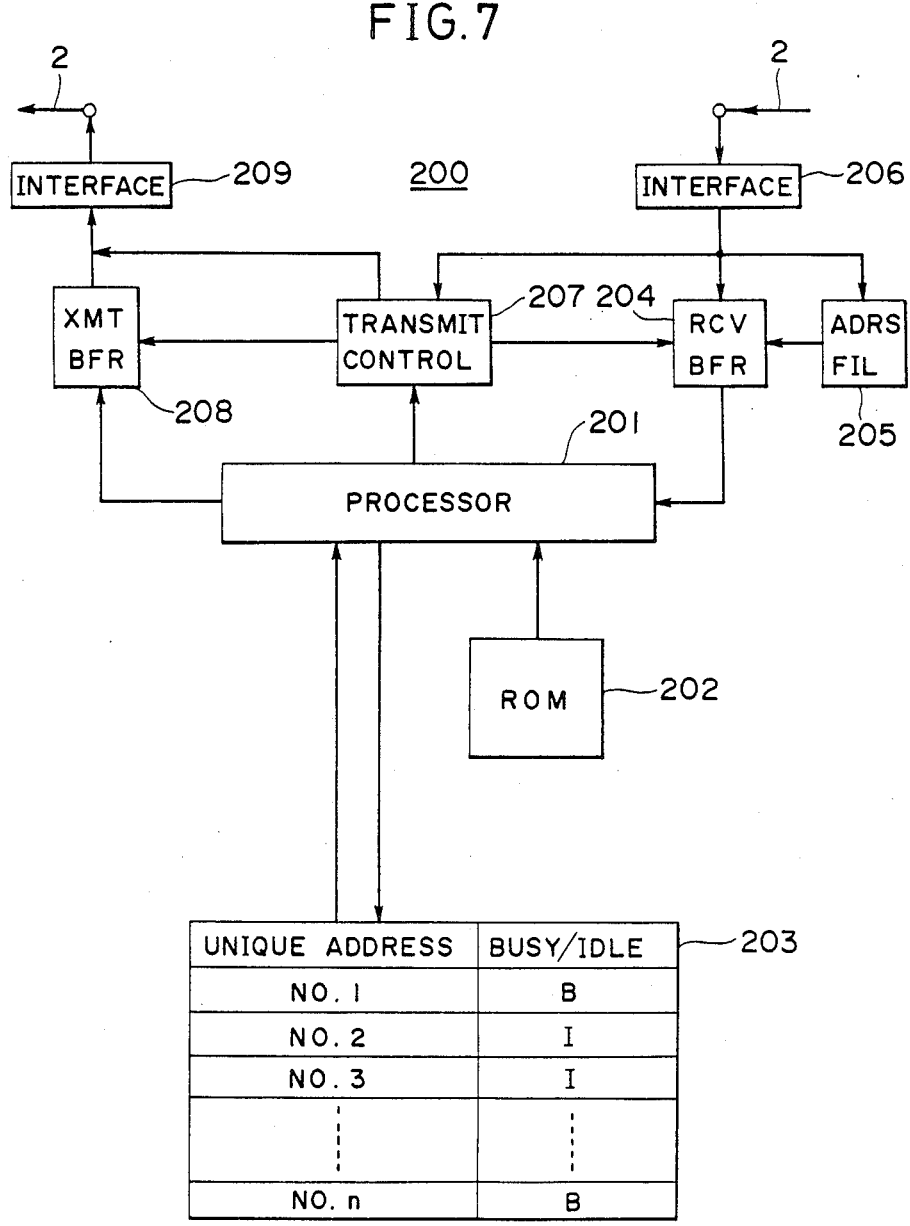
FIG. 7 is a block diagram of a control station according to a second embodiment of the invention.

A second embodiment of the present invention is shown in FIG. 7. In this embodiment, a designated, or central node station is provided with a unique address management controller 200 and the processor 110 of other node stations described previously with reference to FIG. 3 is designed to transmit a unique address request packet from their control-packet transmit buffer 14 to the central node station whenever it receives a request for a first circuit-switched call or the number of simultaneous circuit-switched calls exceeds the maximum number of time slots contained in a given message packet, which is typically 8. Unique address management controller 200 includes a processor 201 which is associated with a read-only memory 202 and a unique address management table 203. Read-only memory 202 stores the program of the processor 201 and the management table 203 contains a list of unique address code patterns designated No. 1 through No. n and busy/idle status indicators respectively indicating the busy-idle state of the unique address code patterns. The unique address request packet is received through an interface 206 by a receive buffer 204 and detected by an address filter 205 that examines the header of the received packet. When detected by the address filter 205, the unique address request packet is supplied from the receive buffer 204 to the processor 201. Processor 201 responds to it by accessing the management table 203 to select an idle unique address code pattern and changes its busy/idle status indicator to busy. Processor 201 generates a return packet including the selected unique address and passes it to a transmit buffer 208 and directs a transmit controller 207 to seize the token to obtain the right to transmit the return packet through interface 209 to the node station requesting the new unique packet. This return packet is passed through the control-packet receive buffer 24 of the unique address requesting station to its processor 110 to permit it to generate a new call setup packet and a message packet both having the assigned unique address. When all the time slots of such a message packet become empty, the node station transmits a packet including the assigned unique address to the central station. Processor 201 of the central station receives it through buffer 204 and changes the busy/idle status indicator of this unique address to idle.

The maximum number of unique addresses to be assigned to the network depends on the bandwidth, or maximum transmission speed of the transmission loop 2. If the maximum transmission speed of the loop is 8 Mbps and the maximum number of time slots for each message packet is 8 with each time slot having a transmission speed of 64 kbps, then the maximum number of unique address assigned to the network is 15. In this way bandwidth management of the transmission medium of the network can be realized.

Furthermore, the length of the unique address according to the second embodiment is independent of the number of node stations or the number of user terminals served by each station, but dependent exclusively on the bandwidth of the transmission medium 2, the maximum number of time slots in one message packet and the bandwidth assigned to each time slot. The number of bits to represent the unique address can be made smaller than that required in the first embodiment of the invention

ADVANTAGES OF THE INVENTION (1) Since multiple destination circuit-switched calls can be multiplexed on a single message packet, transmission efficiency does not degrade significantly even though the information bits carried by each message packet are small in relation to the number of message packets to be sent for a given circuit-switched call. As a result, the amount of delays caused by the framing and deframing of the packet can be held to an acceptable value and the message-packet transmit and receive buffers for packet framing and deframing operations can be economically realized.

(2) Since the message packet is not generated on a per destination node basis, buffers are not required for each station in proportion to the number of node stations in the whole network.

(3) Since the circuit-switched message packet is of variable length, the network of the present invention has a high transmission efficiency.

(4) The unique address management serves to realize traffic control as well as bandwidth management control.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for communication for a packet-switched communications network in which a plurality of stations are interconnected by a transmission medium and each station services a plurality of user terminals, comprising:

communicating a unique address and first and second time slot numbers from a source station to one or more destination stations, the combination of said unique address and said first time slot number identifying a first circuit-switched call from a first source terminal of said source station to a first destination terminal and the combination of said unique address and said second time slot number identifying a second circuit-switched call from a second source terminal of said source station to a second destination terminal, said first and second destination terminals being serviced by said one or more destination stations; and transmitting first and second circuit-switched signals from said first and second source user terminals respectively on first and second time slots of a single packet along with said unique address from said source station to said transmission medium to allow said one or more destination stations to extract said first and second circuit-switched signals from the first and second time slots in accordance with said first and second time slot numbers, respectively, and apply the extracted signals to said first and second destination terminals when said unique address contained in said packet coincides with the previously communicated unique address.

2. A method for communication for a packet-switched communications network in which a plurality of stations are interconnected by a transmission medium and each station services a plurality of user terminals, comprising:

selecting a unique address from among a plurality of specific addresses of said network smaller in number than the number of said stations;

communicating the selected unique address from a designated station to a source station;

communicating said selected unique address and first and second time slot numbers from the source station to one or more destination stations, the combination of said unique address and said first time slot number identifying a first circuit-switched call from a first source terminal of said source station to a first destination terminal and the combination of said unique address and said second time slot number identifying a second circuit-switched call from a second source terminal of said source station to a second destination terminal, said first and second destination terminals being serviced by said one or more destination stations; and transmitting first and second circuit-switched signals from said first and second source user terminals respectively on first and second time slots of a single packet along with said unique address from said source station to said transmission medium to allow said one or more destination stations to extract said first and second circuit-switched signals from the first and second time slots in accordance with said first and second time slot numbers, respectively, and apply the extracted signals to said first and second destination terminals when said unique address contained in said packet coincides with the previously communicated unique address.

3. A packet-switched communications network having a plurality of node stations and a transmission medium of interconnecting said node stations, each of said node stations serving one or more user terminals, wherein each of said node stations comprises:

first transmit means responsive to a request for a circuit-switched call from a source user terminal of the own station for transmitting to said transmission medium a control packet containing a source address identifying said source user terminal, a destination address identifying a destination user terminal of another node station, a unique address and a time slot number identifying the position of a time slot in which a circuit-switched signal from said source user terminal is to be contained;

second transmit means for transmitting to said transmission medium a message packet containing said unique address and a plurality of time slots one of which is identified by said time slot number, said identified time slot containing said circuit-switched signal;

first receive means for receiving g said control packet through the transmission medium when the destination address contained therein coincides with the address of a user terminal serviced by the own station; and second receive means for receiving the message packet through the transmission medium if the unique address contained therein coincides with the unique address contained in the received control packet, extracting the circuit-switched signal from the time slot of the received message packet in accordance with the time slot number contained in said received control packet and applying the extracted signal to said user terminal identified by said destination address.

4. A packet-switched communications network having a plurality of node stations and a transmission medium for interconnecting said node stations, each of said node stations serving one or more user terminals, wherein each of said node stations comprises:

means responsive to a request for a circuit-switched call from a source user terminal of the own station for transmitting to said transmission medium a control packet including a source address identifying said source user terminal, a destination address identifying a destination user terminal of another node station, a unique address and a time slot number identifying the position of a circuit-switched signal from said source user terminal;

means for receiving said control packet when the destination address contained therein coincides with the address of a user terminal serviced by the own station;

a transmit buffer having a plurality of memory cells;

transmit buffer read/write control means for writing said unique address and a plurality of circuit-switched signals from one or more source user terminals into the memory cells of said transmit buffer to compose a message packet, the memory cells storing said circuit-switched signals being identified by the respective time slot numbers contained in a plurality of said control packets, and reading said message packet out of said transmit buffer onto said transmission medium;

a receive buffer having a plurality of memory cells; and receive buffer read/write control means for receiving the message packet through the transmission medium, detecting the unique address in said received message packet, generating a memory address in response to the detection of said unique address, establishing a relationship between the destination address, unique address and time slot number contained in each of a plurality of said received control packets and the unique address contained in the received message packet and said memory address, writing the circuit-switched signals contained in the received message packet into the memory cells of said receive buffer in accordance with said established relationship, and sequentially reading the circuit-switched signals out of said receive buffer to a plurality of destination user terminals having the same destination addresses as those contained in a plurality of said control packets.

5. A packet-switched communications network as claimed in claim 4, wherein said relationship is established by a control memory and means for writing data associated with said destination address into a cell of said control memory which is addressable as a function of the unique address and time slot number contained in the received control packet and reading said stored data out of said control memory as a function of the unique address contained in said received message packet and said incremental address into said receive buffer as a write address pointer.

6. A packet-switched communications network having a transmitting station and a receiving station interconnected by a transmission medium, each of said stations servicing a plurality of user terminals, wherein:

said transmitting station comprises means for transmitting to said receiving station a control packet in response to a request for a circuit-switched call from a source user terminal of the transmitting station, said control packet including a source address identifying said source user terminal, a destination address identifying a destination user terminal of the receiving station, a unique address and a time slot number, and a message packet including said unique address and a plurality of time slots which are identified by the time slot numbers contained in a plurality of said control packets, said time slots containing circuit-switched signals from one or more of said source user terminals; and said receiving station comprises means for receiving said control packet when the destination address coincides with the address of a user terminal of the receiving station, receiving the message packet when the unique address contained therein coincides with the unique address contained in said received control packet, extracting the circuit-switched signals from the received message packet in accordance with the time slot numbers contained in a plurality of said control packets and applying the extracted signals to the user terminals identified by the destination addresses contained in said plurality of control packets of the receiving station.

7. A packet-switched communications network having a transmitting station and a receiving station interconnected by a transmission medium, each of said stations servicing a plurality of user terminals:

wherein said transmitting station comprises:

means responsive to a request for a circuit-switched call from a source user terminal of the own station for transmitting to said transmission medium a control packet including a source address identifying said source user terminal, a destination address identifying a destination user terminal of another node station, a unique address and a time slot number identifying the position of a time slot in which a circuit-switched signal from said source user terminal is to be contained;

a transmit buffer having a plurality of memory cells; and transmit buffer read/write control means for writing said unique address and a plurality of circuit-switched signals from one or more source user terminals into the memory cells of said transmit buffer to compose a message packet, the memory cells storing said circuit-switched signals being identified by the respective time slot numbers contained in a plurality of said control packets, and reading said message packet out of said transmit buffer onto said transmission medium:

wherein said receiving station comprises:

means for receiving said control packet when the destination address contained therein coincides with the address of a user terminal of the receiving station;

a receive buffer having a plurality of memory cells; and receive buffer read/write control means for receiving the message packet through the transmission medium, detecting the unique address in said received message packet, generating a memory address in response to the detection of said unique address, establishing a relationship between the destination address, unique address and time slot number contained in each of a plurality of said received control packets and the unique address contained in the received message packet and said memory address, writing the circuit-switched signals contained in the received message packet into the memory cells of said receive buffer in accordance with said established relationship, and sequentially reading the circuit-switched signals out of said receive buffer to a plurality of destination user terminals having the same destination addresses as those contained in a plurality of said control packets.

8. A packet-switched communications network as claimed in claim 7, wherein said relationship is established by a control memory and means for writing data associated with said destination address into a cell of said control memory which is addressable as a function of the unique address and time slot number contained in the received control packet and reading said stored data out of said control memory as a function of the unique address contained in said received message packet and said incremental address into said receive buffer as a write address pointer.

9. A packet-switched communications network having a first station and a plurality of second stations and a transmission medium for interconnecting said first station and said second stations, each of said second stations serving one or more user terminals and including means for transmitting a request for a circuit-switched call to said transmission medium, wherein said first station comprises:

means for selecting a unique address from among a plurality of unique addresses smaller in number than the number of said second stations, assigning the selected unique address to a circuit-switched call request transmitted from one of said second stations and transmitting said assigned unique address to said transmission medium, and wherein said second station which transmits said call request comprises:

first receive means for receiving said assigned unique address through said transmission medium;

first transmit means for transmitting to said transmission medium a control packet containing a source address identifying a source user terminal of the own station, a destination address identifying a destination user terminal of another station, said received unique address and a time slot number identifying the position of a time slot in which a circuit-switched signal from said source user terminal is to be contained;

second transmit means for transmitting to said transmission medium a message packet containing said unique address and a plurality of time slots one of which is identified by said time slot number, sad identified time slot containing said circuit-switched signal;

said first receive means receiving the control packet through the transmission medium when the destination address contained therein coincides with the address of a user terminal serviced by the own station; and second receive means for receiving the message packet through the transmission medium when the unique address contained therein coincides with the unique address contained in the received control packet, extracting the circuit-switched signal from the time slot of the received message packet in accordance with the time slot number contained in said received control packet and applying the extracted signal to the user terminal identified by said destination address.

10. A packet-switched communications network as claimed in claim 9, wherein said second transmit means comprises:

a transmit buffer having a plurality of memory cells; and transmit buffer read/write control means for writing said received unique address and a plurality of circuit-switched signals from one or more source user terminals into the memory cells of said transmit buffer to compose said message packet, the memory cells storing said circuit-switched signals being identified by the. respective time slot numbers contained in a plurality of said control packets, and reading said message packet out of said transmit buffer onto said transmission medium, wherein said second receive means comprises:

a receive buffer having a plurality cells; and receive buffer read/write control means for receiving the message packet through the transmission medium, detecting the unique address in said received message packet, generating a memory address in response to the detection of said unique address, establishing a relationship between the destination address, unique address and time slot number contained in each of a plurality of said received control packets and the unique address contained in the received message packet and said memory address, writing the circuit-switched signals contained in the received message packet into the memory cells of said receive buffer in accordance with said established relationship, and sequentially reading the circuit-switched signals out of said receive buffer to a plurality of destination user terminals having the same destination addresses as those contained in a plurality of said control packets.

* * * * *

UNITED STATES PATENT AND TRADEMARK OFFICE
CERTIFICATE OF CORRECTION

PATENT NO. : 4,815,071

DATED : March 21, 1989

INVENTOR(S) : Hiroshi Shimizu

It is certified that error appears in the above-identified patent and that said Letters Patent is hereby corrected as shown below:

Col. 1, lines 14 and 15, delete "medium of the network are occupied" and insert --medium of the networks is occupied--.

Col. 1, line 16, delete "network is" and insert --networks are--.

Col. 3, line 67, after "equally" delete --be--.

Col. 4, line 67, delete "ar" and insert --are--.

Col. 16, line 37, delete "sad" and insert --said--.

Col. 17, line 3, after "plurality" insert -- of memory--.

Signed and Sealed this

Twelfth Day of December, 1989

Attest:

JEFFREY M. SAMUELS

Attesting Officer     Acting Commissioner of Patents and Trademarks